United States Patent
Mallary

(10) Patent No.: US 6,359,757 B1
(45) Date of Patent: Mar. 19, 2002

(54) ELECTROSTATIC ACTUATOR

(75) Inventor: Michael Mallary, Sterling, MA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/324,575

(22) Filed: Jun. 2, 1999

(51) Int. Cl.$^7$ ............................................... G11B 5/55
(52) U.S. Cl. ........................ 360/294.3; 137/1; 310/309
(58) Field of Search ........................... 360/294.1, 294.3; 310/309; 137/1

(56) References Cited

U.S. PATENT DOCUMENTS

| | | | |
|---|---|---|---|
| 4,943,750 A | * 7/1990 | Howe et al. | 310/309 |
| 5,506,175 A | 4/1996 | Zhang et al. | 437/228 |
| 5,536,988 A | 7/1996 | Zhang et al. | 310/309 |
| 5,696,655 A | * 12/1997 | Kawano et al. | 360/326 |
| 5,726,073 A | 3/1998 | Zhang et al. | 437/228 |
| 5,751,683 A | * 5/1998 | Kley | 369/126 |
| 5,753,911 A | * 5/1998 | Yasuda et al. | 250/306 |
| 5,834,864 A | * 10/1998 | Hesterman et al. | 310/40 MM |
| 5,959,808 A | * 9/1999 | Fan et al. | 360/294.3 |
| 5,986,381 A | * 11/1999 | Hoen et al. | 310/309 |
| 5,995,334 A | * 11/1999 | Fan et al. | 360/294.3 |
| 6,116,257 A | * 9/2000 | Yokota et al. | 137/1 |
| 6,126,140 A | * 10/2000 | Johnson et al. | 251/129.01 |
| 6,178,069 B1 | * 1/2001 | Suzuki | 360/294.5 |
| 6,188,665 B1 | * 2/2001 | Furusawa | 369/219 |
| 6,215,222 B1 | * 4/2001 | Hoen | 310/309 |

FOREIGN PATENT DOCUMENTS

| | | | |
|---|---|---|---|
| JP | 403164073 A | * | 7/1991 |
| JP | 407284280 A | * | 10/1995 |
| JP | 40703381 A | * | 11/1995 |

* cited by examiner

*Primary Examiner*—Hoa T. Nguyen
*Assistant Examiner*—Franklin D. Altman, III
(74) *Attorney, Agent, or Firm*—Fish & Richardson, P.C.

(57) ABSTRACT

An electrostatic actuator includes liquid in the gap between elements of an electrostatic actuator. Preferred liquids have a high dielectric constant, which amplifies the electrostatic force induced between the elements by a voltage across the elements, thereby increasing the strength of the actuator and enabling the actuator to be used in a variety of applications. In addition, the liquid avoids contact between the elements that might otherwise occur during use. This helps prevent arcing between the elements and accompanying wear, as well as catastrophic failure such as the plates breaking as they collide. Preferred liquids are also substantially nonelectrically conductive, chemically stable, have a high breakdown voltage, low viscosity, and low vapor pressure to avoid evaporation. An exemplary liquid is diffusion pump oil.

23 Claims, 2 Drawing Sheets

ELECTROSTATIC ACTUATOR

BACKGROUND

This invention relates to electrostatic actuators.

Electrostatic actuators are used in micro-electromechanical systems (MEMS) for producing fine positional adjustments of a load along one axis or multiple axes.

A typical electrostatic actuator includes multiple pairs of electrode elements spaced by a gap and mounted on two plates. One plate is stationary, while the other plate is mounted for movement with respect to the first plate and is attached to the load. When energy is applied to the plates, the voltage induced across the gaps between the pairs of elements generates an electrostatic attractive force between the pairs of electrodes, which in turn produces relative motion between the plates, thereby moving the load.

SUMMARY

In one general aspect, this invention features placing a liquid in the gap between elements of an electrostatic actuator.

Preferred embodiments may include one or more of the following features.

The liquid has a dielectric constant selected to produce a predetermined increase in an electrostatic force produced between the elements in response to a given applied voltage. Such force amplification is produced if the dielectric constant exceeds one. Thus, the dielectric constant of the liquid is preferably greater than one, more preferably is greater than 2, and most preferably is greater than 4.

The liquid is substantially nonelectrically conductive. For example, the liquid has a resistivity of on the order of $10^{12}$ ohm-cm. or higher. Such low conductivity avoid corrosive electrolytic interaction between the elements which could degrade the life of the actuator.

The liquid is chemically stable and has a high breakdown so as not to substantially dissociate in the presence of an electric field produced between the elements by the applied voltage. This avoids the liquid becoming progressively more electrically conductive over time. The chemical stability also inhibits electrical breakdown between the actuator elements.

The viscosity of the liquid provides a selected amount of damping of the relative movement of the elements. Preferably, the viscosity is less than 1 poise, and more preferably the viscosity is less than 0.01 poise.

The liquid has a low vapor pressure to avoid the liquid evaporating away during fabrication of the actuator or subsequent use. If the vapor pressure is selected to be sufficiently low, e.g., on the order of $10^{-7}$ mm Hg or less, may avoid the need for a containment envelope for the liquid. Preferably, the liquid has a melting point of less than 0 degrees F. to remain in the liquid state over a normal range of operating temperatures.

One exemplary liquid is diffusion pump oil. Other examples of the liquid include perfluorcarbons and hydrofluorocarbons, and halides. The liquid may be selected from a group consisting of chlorobenzene, cis 1,2 dichloroethylene, orthodichlorobenzen, and nitrobenzene.

The actuator may include an envelope in which the elements and the liquid are disposed. Because it is contained and cannot evaporate, the liquid may have a lower vapor pressure than the range given above. The actuator may also include a biasing member coupled between the elements to return the elements to an initial relative position when the voltage is removed therefrom.

In a particularly useful application, the actuator is used to position a transducer which exchanges data signals with a storage medium in a data storage apparatus. The first member is connected to an arm and the second member includes a support for the transducer and is mounted for movement with respect to the arm. The first element of the actuator is part of a first group of elements mounted on the first member, and the second element is part of a second group of the elements mounted to the second member. The liquid is disposed in gaps between corresponding elements in the first and second groups.

In one embodiment, the elements in the first and second groups are linearly disposed in a first direction with respect to the arm and the transducer support and are interleaved with each other, whereby the relative movement is linear and transverse to the first direction. In another embodiment, the elements in the first and second groups are disposed in a circular pattern about an axis and are interleaved with each other, whereby the relative movement is rotational about the axis.

The transducer may be, e.g., a magnetic sensor, a giant magnetoresistive head, or an optical sensor.

The liquid provides numerous advantages. The force amplification increases the strength of the actuator and enables the actuator to be used in a variety of applications. In addition, the liquid avoids contact between the elements that might otherwise occur during use. This helps prevent arcing between the elements and accompanying wear, as well as catastrophic failure such as the plates breaking as they collide.

Other features and advantages of the invention will be apparent from the following detailed description, and from the claims.

DRAWINGS

DESCRIPTION OF EMBODIMENTS

Figure 1:
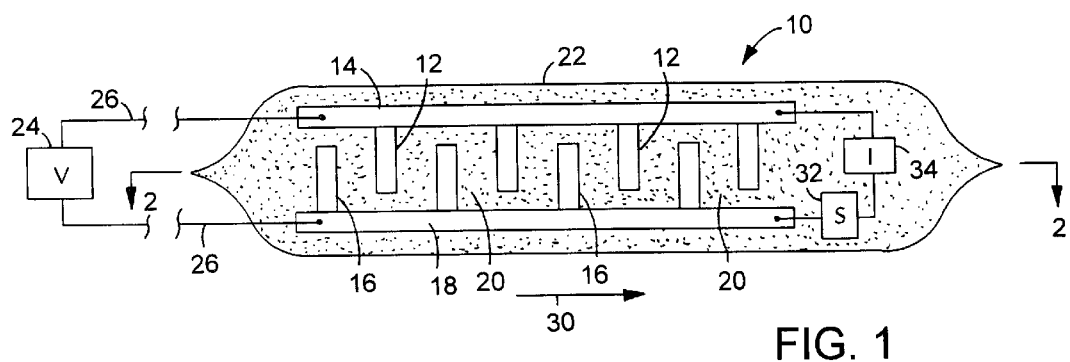
FIG. 1 shows an electrostatic actuator.
Figure 2:
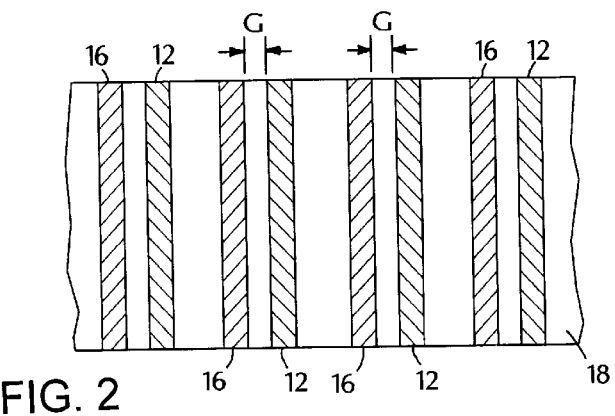
FIG. 2 is a cross-sectional view, taken along line 2—2, of the elements of the electrostatic actuator of FIG. 1.

Referring to FIGS. 1 and 2, a liquid dielectric electrostatic actuator 10 includes a set of elements 12 mounted on a stationary upper plate 14 and spaced by a gap G from a corresponding set of elements 16 mounted on a movable lower plate 18. That is, each element 12 is paired with an element 16 and is spaced therefrom by gap G. Elements 12, 16 extend across the width of respective plates 14, 18 (FIG. 2). A liquid 20 fills the gap G between elements 12, 16 and the spacing between plates 14, 18, and serves as the dielectric material for actuator 10. Liquid 20 is encased within electrostatic actuator 10 by an envelope 22 (such as a thin, flexible mylar film).

Plates 14, 18 (and hence elements 12, 16) are connected to a voltage source 24 by a set of leads 26 which protrude through envelope 22. When voltage source 24 is energized, the generated voltage is applied across each of the gaps G between pairs of elements 12, 16, thereby producing an electrostatic attractive force between pairs of elements 12, 16. The electrostatic attractive force pulls elements 16 toward elements 12, thereby moving lower plate 18 with respect to stationary upper plate 14 in the direction of arrow 30. Plates 14, 18 are connected together by a spring mechanism (S) 32 which returns lower plate 18 to its at-rest position when voltage source 24 is de-energized. An insulator (I) 34 connected between plates 14, 18 maintains electrical isolation between the plates.

For a given level of voltage applied by source 24, the electrostatic attractive force produced between pairs of elements 12, 16 is proportional to the dielectric constant of liquid 20. Put another way, liquid 20 amplifies the electrostatic attractive force if its dielectric constant is greater than one (i.e., the dielectric constant of air, which is used in conventional electrostatic actuators to occupy the gap between the pairs of elements). The amplification provided by liquid 20 increases the actuation force and stroke distance (i.e., the amount by which plate 18 is moved along arrow 30) of actuator 10 compared with conventional, air dielectric electrostatic actuators. The increased actuation force also allows spring 32 to be made stiffer, thereby increasing the resonant frequency of electrostatic actuator 10. Among other advantages, in embodiments in which actuator 10 positions a transducer in a disk drive, the increased resonant frequency allows actuator 10 to respond rapidly to tracking errors in the disk drive.

The reason for the force amplification can be seen by considering elements 12, 16 to be the plates of a capacitor having liquid 20 as its dielectric. The force between the plates of an immersed capacitor of capacitance C is derived as follows. When a charge Q is placed on the plates, the voltage across the plates is:

$$V=Q/C \qquad (1)$$

and the energy B stored in the capacitor is:

$$E=CV^2/2 \qquad (2)$$

Because capacitance C is inversely proportional to the spacing between the plates, if the plates are pulled apart so that the spacing (e.g., gap G) is doubled, the capacitance is reduced by half. Accordingly, the voltage V across the plates and the stored energy E are doubled (see equation 2). Conservation of energy dictates that the source of the stored energy increase must be the attractive electrostatic force acting over the gap between the plates. Because capacitance C is proportional to the dielectric constant of liquid 20, and the increase in stored energy is proportional to C (for a given voltage V), it follows that the electrostatic attractive force between the plates is also proportional to the dielectric constant of liquid 20.

As discussed below, one application for electrostatic actuator 10 is as a micro-electromechanical system (MEMS) for micropositioning a transducer (e.g., a write head and a read head in a disk drive). To provide actuator 10 with sufficient actuation force and/or stroke distance to move the transducer over an acceptable range of positions, liquid 20 should have a relatively high dielectric constant compared to air, preferably 2 or higher, and more preferably 4 or higher. Exemplary liquids 20 are discussed below, but first, other properties of liquid 20 that may be important in some applications are explained. The selection of the composition of liquid 20 will often involve balancing all of these properties (including dielectric constant).

The preferred liquid 20 will have (in addition to a high dielectric constant), high resistivity, low viscosity, low vapor pressure, and low melting point. In addition, liquid 20 should be chemically stable and have a high breakdown voltage to avoid becoming dissociated in response to the electric field induced between elements 12, 16. These latter two properties are related to the resistivity of liquid 20. All of these properties should be relatively temperature insensitive so that liquid 20 performs consistency over the normal operating temperature of actuator 10. In addition, liquid 20 must be chemically compatible with the materials of plates 14, 18, elements 12, 16, and envelope 22.

The resistivity of liquid 20 should be sufficiently high so that liquid 20 is substantially nonelectrically conductive. This avoids corrosive electrolytic interaction between elements 12, 16. For example, liquid 20 should have a resistivity on the order of $10^{12}$ ohm-cm. or higher. Liquid 20 should also be sufficiently chemically stable and have a breakdown voltage sufficiently high such that liquid 20 does not substantially dissociate in the presence of electrical fields. Such dissociation might reduce the resistivity (i.e., increase the conductivity) of liquid 20, which could lead to corrosive current flow between elements 12, 16. In addition, high resistivity avoids power dissipation associated with the flow of electrical current.

The viscosity of liquid 20 also provides advantages over air-dielectric actuators. As elements 12, 16 are pulled together in response to the applied voltage, the viscous flow of liquid 20 between elements 12, 16 provides damping to reduce oscillation and mute resonances between elements 12, 16. Accordingly, liquid 20 increases the linearity between the applied voltage and the amount of displacement between elements 12, 16. To optimize damping, the viscosity should be tuned to the geometry of actuator 10 (i.e., the arrangement of elements 12, 16) and the resonant frequency of actuator 10. But in any event, the viscosity should be relatively low, preferably less than 1 poise, and more preferably less than 0.01 poise.

Even with such a low viscosity, fluid 20 also helps prevent elements 12, 16 from contacting each other during use, which could cause arcing and wear and, in extreme cases, destroy elements 12, 16. The viscosity of fluid 20 induces pressure in gap G that resists flow of fluid 20 from between elements 12, 16. As elements 12, 16 approach contact, the flow-resistant pressure increases as the inverse third power of the spacing between elements 12, 16. As a result, the flow-resistant pressure rapidly approaches infinity as separation between elements 12, 16 approaches zero. In addition, as the separation becomes less than about five molecular layers of liquid 20, the flow-resistant pressure increases by approximately one order of magnitude as each subsequent molecular layer is removed. Accordingly, liquid 20 maintains a separation between elements 12, 16 of at least several molecular layers of liquid 20, even when actuator 10 is operated under high mechanical shock and vibration conditions.

Another property that liquid 20 should possess is a sufficiently low vapor pressure (which corresponds to a high boiling point), to avoid liquid 20 evaporating away during manufacture of actuator 10 or during use over its operating lifetime. How low the vapor pressure of liquid 20 should be is a function of the construction of actuator 10. For example, in the embodiment shown in FIG. 1, in which liquid 20 is encased in envelope 22, the vapor pressure can be higher than if envelope were omitted, because envelope 22 serves as a barrier to evaporation. Thus, in the embodiment of FIG. 1, the vapor pressure of liquid 20 can be relatively high (e.g., on the order of 1 mm Hg), as long as the vapor pressure is not so high as to allow liquid 20 to evaporate rapidly during the manufacture of actuator 10. In embodiments in which envelope 22 is omitted, the vapor pressure of liquid 20 should be much lower, for example, on the order of $10^{-7}$ mm Hg or less.

The melting point of liquid 20 should also be relatively low (e.g., less than 0 degrees F.). A low melting point avoids liquid 20 freezing during use over the normal operating temperature range of actuator 10.

As discussed, for a given application, the composition of liquid 20 will often involve balancing all of the properties discussed herein. One fluid 20 believed to be suitable is diffusion pump oil, such as Univac #705 available from United Vacuum (Univac). Although the dielectric constant of diffusion pump oil (approximately 4) is not as high as other possible candidates for fluid 20, diffusion pump oil meets the other criteria set forth above. In particular, diffusion pump oil has a low vapor pressure (typically less than $10^{-7}$ mm Hg; Univac #705 has a vapor pressure of $10^{-10}$ mm Hg). Other highly chemically stable candidates for liquid 20 include transformer oil, perfluorcarbons (which typically have a dielectric constant of approximately 2), and hydrofluorocarbons such as freon (which have a somewhat higher dielectric constant than perfluorocarbons).

Halides (i.e., a compound of a halogen (fluorine, chlorine, bromine, iodine, and astatine) and a hydrocarbon or other more electropositive element or radical) typically have a sufficiently high dielectric constant to serve as liquid 20, because they induce strong dipole moments. Additionally, halides in general are highly chemically stable. Examples of potentially suitable halides include chlorobenzene (dielectric constant of 5.7, boiling point of 132 degrees C.), cis 1,2 dichloroethylene (dielectric constant of 9.2, boiling point of 60 degrees C.), orthodichlorobenzen (dielectric constant of 9.9, boiling point of 180 degrees C.), and nitrobenzene (dielectric constant of 34.8, boiling point of 211 degrees C.).

The plate/element structure of actuator 10 may be fabricated in any suitable way, such as according to the methods described in U.S. Pat. No. 5,726,073, entitled "Compound Stage MEM Actuator Suspended for Multidimensional Motion," (the "'073 patent") which is incorporated herein by reference. The actuator described in the '073 patent is capable of moving a device along three axes (e.g., the x-, y-, and z-axes). Actuator 10 can be modified to provide multiple axis motion, as well, or can be configured as shown in FIG. 1 to induce motion in only one direction.

Figure 3:
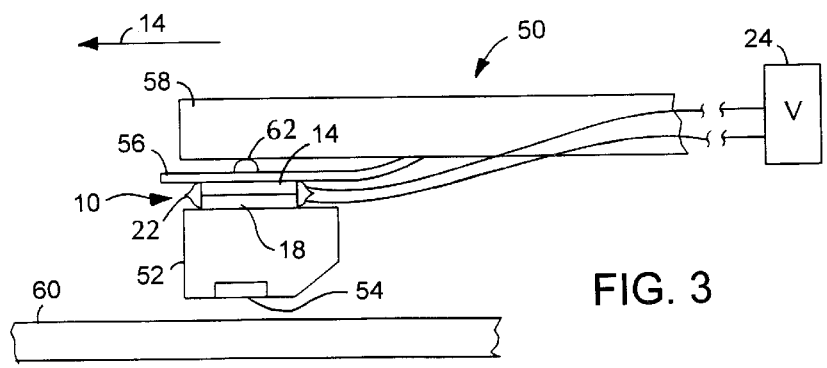
FIG. 3 shows the electrostatic actuator mounted in a disk drive.

FIG. 3 shows one application for actuator 10, as a micropositioner for a transducer in a disk drive 50. In this embodiment, actuator 10 is mounted between a slider 52 (which supports transducer 54) and a flexure 56. A load beam 58 suspends flexure 56 and slider 52 over a storage medium 60, such as a magnetic or optical disk. One end of flexure 56 is attached to load beam 58. The upper surface of the free end of flexure 56 includes a protrusion 62 to which a load beam 58 applies pressure to maintain transducer 54 at the desired fly height above a selected track (not shown) of storage medium 60. (The mechanism for moving load beam 58, and hence slider 52 and transducer 54 across storage medium 60 is not shown.) Transducer 54 may be, e.g., a magnetic device (such as a magnetic sensor or a giant magnetoresistive head), or an optical sensor; likewise, storage medium 60 may store data magnetically or optically. Actuator 10 may be used with other types of transducers and storage media, as well.

The upper and lower plates 14, 18 of actuator 10 are respectively attached to the underside of the free end of flexure 56 and the upper surface of slider 52. Spring mechanism (S) 32 (FIG. 1) interconnects plates 14, 18. Envelope 22 surrounds plates 14, 18 to capture liquid 20 (not shown) therebetween and between elements 12, 16. Leads 26 pass through envelope 22 and extend along flexure 56 and load beam 58 to source 24. Envelope 22 is a sufficiently thin membrane (made from, e.g., a thin, flexible mylar film) so as not to interfere with the relative motion of plates 14, 18.

The direction in which actuator 10 moves transducer 54 depends on the orientation of elements 12, 16. For example, if it is desired to move transducer laterally with respect to the length dimension of flexure 56 (shown by arrow 64), elements 12, 16 are oriented in the direction of arrow 64. Typical amounts of motion are on the order of 1 micron.

Other embodiments are within the scope of the following claims.

For example, the materials discussed above for liquid 20 is not intended to be exhaustive; other materials with properties that meet one or more of criteria discussed above may be used.

Actuator 10 may be modified to move transducer 54 both longitudinally and transversely. In one approach, actuator 10 can have two pairs of plates 14, 18, with elements 12, 16 of each pair oriented as discussed above to provide motion in one of the directions. Liquid 20 is disposed in the gaps between elements 12, 16 of each pair of plates.

Figure 4:
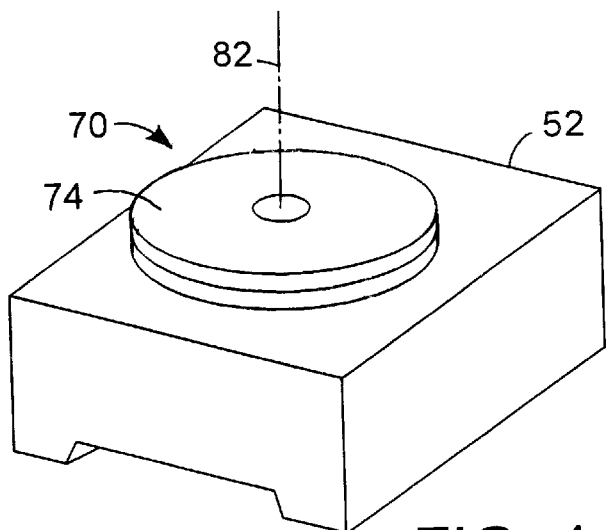
FIG. 4 illustrates an alternative embodiment of an electrostatic actuator mounted on a transducer slider.
Figure 5:
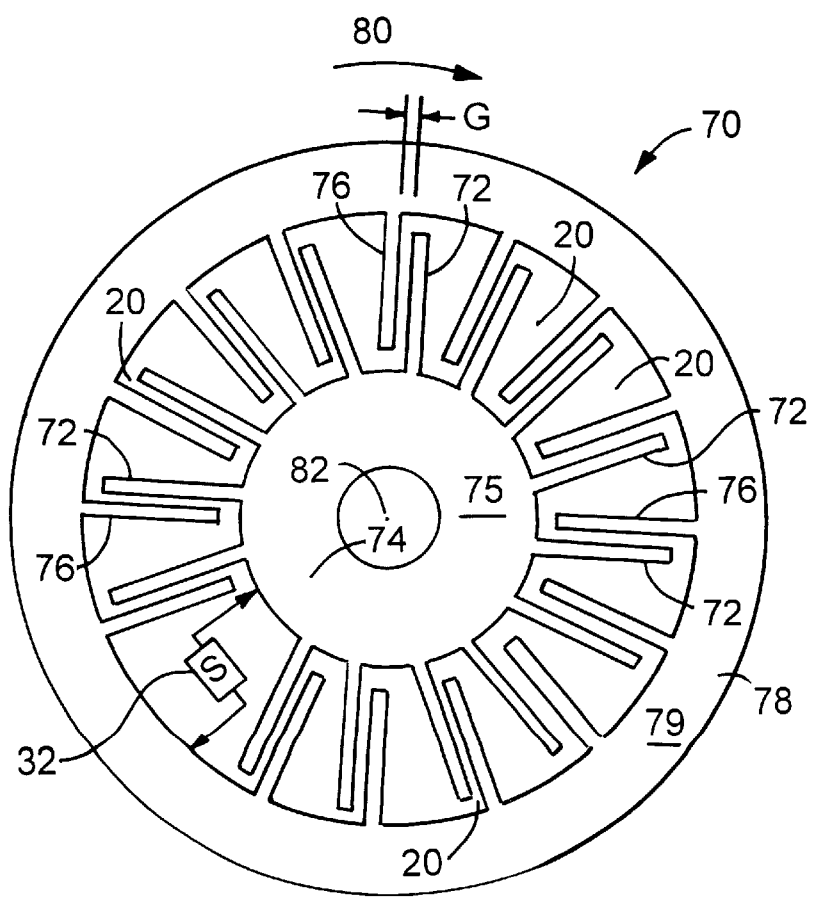
FIG. 5 is a top view of the electrostatic actuator of FIG. 4, which shows the arrangement of the elements of the actuator.

Referring also to FIGS. 4 and 5, actuator 70 is configured to rotate slider 52 with respect to the flexure (not shown). Actuator 70 includes a set of elements 72 which extend radially outwardly from an inner circular plate 74 and are interleaved with a corresponding set of elements 16 which extend radially inwardly from an outer circular plate 78. As with actuator 10, each element 72 is paired with an element 76 and is spaced therefrom by gap G. Plate 74 is attached to the underside of the flexure (not shown), and plate 78 is attached to the upper surface of slider 52 for rotation with respect to plate 74 around vertical axis 82. Liquid 20 (not shown) is disposed in gaps G between each pair of elements 72, 76, as well as in the spaces between adjacent pairs of elements 72, 76 and the plates 74, 78 themselves, and is encased by an envelope (not shown). Plates 72, 76 are connected to source 24 (FIG. 3) by leads (not shown). A spring mechanism (S) 32 is positioned between plates 74, 78 (e.g., interconnecting the central hub 75 of plate 74 with the outer rim 79 of plate 78) to bias elements 72, 76 to their at-rest spacing.

In use, when source 24 is energized to apply voltage (e.g., 65 volts) across elements 72, 76, the resultant electrostatic attractive force therebetween pulls elements 72 towards elements 76, thereby rotating plate 78 and slider 52 with respect to plate 74 and the flexure in the direction of arrow 80. As a result, actuator 70 rotates the transducer with respect to the storage medium to make small adjustments in transducer position relative to the stored data signals. Spring mechanism (S) 32 returns plate 74 to its at-rest position when the voltage is removed, thereby restoring the at-rest gap G between elements 72, 76.

Still other embodiments are possible. For example, the actuator may be used in other applications, such as to control the positioning of arrays of microprobes that are used to read and write information from and to a recording surface on a very small scale.

What is claimed is:

1. An electrostatic actuator comprising
   a plurality of elements spaced by a gap for relative movement in response to voltage applied across the elements, and a liquid disposed in the gap between the elements, wherein the liquid has a dielectric constant greater than 2, has a resistivity of on the order of $10^{12}$ ohm-cm. or higher, is chemically stable so as not to substantially dissociate in the presence of an electric field produced between the elements by the applied voltage, has a viscosity of less than 1 poise, has a vapor pressure on the order of $10^{-7}$ mm Hg or lower, and has a melting point of less than 0 degrees F.

2. An electrostatic actuator comprising:

a plurality of elements spaced by a gap for relative movement in response to voltage applied across the elements, a liquid disposed in the gap between the elements, a first member connected to a first one of the elements, and a second member connected to a second one of the elements and mounted for movement with respect to the first member in response to the voltage applied between the elements, and wherein the first member includes an arm and the second member includes a support for a transducer.

3. The actuator of claim 2 wherein the elements comprise a first group, including the first element, adapted to be connected to the arm and a second group, including the second element, adapted to be connected to the transducer support, the liquid being disposed in gaps between corresponding elements in the first and second groups.

4. The actuator of claim 3 wherein the elements in the first and second groups are linearly disposed in a first direction with respect to the arm and the transducer support and are interleaved with each other, whereby the relative movement is linear and transverse to the first direction.

5. The actuator of claim 3 wherein the elements in the first and second groups are disposed in a circular pattern about an axis and are interleaved with each other, whereby the relative movement is rotational about the axis.

6. An electrostatic actuator comprising a plurality of elements spaced by a gap for relative movement in response to voltage applied across the elements, a liquid disposed in the gap between the elements, and a biasing member coupled between the elements to return the elements to an initial relative position when the voltage is removed therefrom.

7. Apparatus comprising a transducer for exchanging data signals with a storage medium, an electrostatic actuator for positioning the transducer relative to the storage medium, the actuator comprising a plurality of elements spaced by a gap for relative movement in response to voltage applied across the elements, and a liquid disposed in the gap between the elements.

8. The apparatus of claim 7 wherein the liquid has a dielectric constant selected to produce a predetermined increase in an electrostatic force produced between the elements in response to a given applied voltage.

9. The apparatus of claim 7 wherein the liquid is substantially nonelectrically conductive.

10. The apparatus of claim 7 wherein the liquid is chemically stable so as not to substantially dissociate in the presence of an electric field produced between the elements by the applied voltage.

11. The apparatus of claim 7 wherein the liquid has a viscosity that provides a selected amount of damping of the relative movement of the elements.

12. The apparatus of claim 7 wherein the liquid is diffusion pump oil.

13. The apparatus of claim 7 further comprising an arm connected to a first one of the elements, and a support for the transducer connected to a second one of the elements and mounted for movement with respect to the first member in response to the voltage applied between the elements.

14. The apparatus of claim 13 wherein the elements comprise a first group, including the first element, adapted to be connected to the arm and a second group, including the second element, adapted to be connected to the transducer support, the liquid being disposed in gaps between corresponding elements in the first and second groups.

15. The apparatus of claim 14 wherein the elements in the first and second groups are linearly disposed in a first direction with respect to the arm and the transducer support and are interleaved with each other, whereby the relative movement is linear and transverse to the first direction.

16. The apparatus of claim 14 wherein the elements in the first and second groups are disposed in a circular pattern about an axis and are interleaved with each other, whereby the relative movement is rotational about the axis.

17. Apparatus for use with a data storage medium, comprising a transducer for exchanging data signals with a storage medium, the transducer being mounted on a support, an arm for moving the support across a surface of the storage medium, and an electrostatic actuator for positioning the transducer at a selected position relative to the storage medium, the actuator comprising a plurality of elements spaced by a gap for relative movement in response to voltage applied across the elements, and a liquid disposed in the gap between the elements.

18. The apparatus of claim 17 wherein the liquid has a dielectric constant selected to produce a predetermined increase in an electrostatic force produced between the elements in response to a given applied voltage.

19. The apparatus of claim 17 wherein a first one of the elements is connected to the arm and a second one of the elements is connected to the transducer support, the elements producing relative movement between the support and the arm in response to the voltage applied between the elements.

20. The apparatus of claim 17 wherein the transducer includes a magnetic sensor.

21. The apparatus of claim 17 wherein the transducer includes a giant-magnetoresistive head.

22. The apparatus of claim 17 wherein the transducer includes an optical sensor.

23. A data storage apparatus comprising a data storage medium, a transducer for exchanging data signals with the storage medium, the transducer being mounted on a support, an arm for moving the substrate across a surface of the storage medium, and an electrostatic actuator for positioning the transducer at a selected position relative to the storage medium, the actuator comprising (a) a plurality of elements spaced by a gap for relative movement in response to voltage applied across the elements, a first one of the elements being connected to the arm and a second one of the elements being connected to the transducer support, and (b) a liquid disposed in the gap between the elements.

* * * * *